(12) United States Patent
Yu et al.

(10) Patent No.: US 8,778,485 B2
(45) Date of Patent: Jul. 15, 2014

(54) ELASTIC MULTI-LAYER FILMS AND ELASTIC ARTICLE THEREOF

(75) Inventors: Tzer-Shun Yu, Kaohsiung (TW); Yen-Hsia Wang, New Taipei (TW); Kuang-Cheng Chen, Kaohsiung (TW); Dan-Cheng Kong, Hsinchu (TW)

(73) Assignees: TSRC Corporation, Taipei (TW); Industrial Technology Research Institute, Chutung Township, Hsinchu County (TW)

( * ) Notice: Subject to any disclaimer, the term of this patent is extended or adjusted under 35 U.S.C. 154(b) by 112 days.

(21) Appl. No.: 13/340,293

(22) Filed: Dec. 29, 2011

(65) Prior Publication Data
US 2013/0164514 A1 Jun. 27, 2013

(30) Foreign Application Priority Data
Dec. 22, 2011 (TW) .............................. 100147928 A

(51) Int. Cl.
*B32B 7/02* (2006.01)
*B32B 7/12* (2006.01)
*B32B 27/06* (2006.01)

(52) U.S. Cl.
USPC ........ 428/212; 428/216; 428/332; 428/423.1; 428/424.8

(58) Field of Classification Search
USPC .................... 428/212, 423.1, 424.8, 216, 332
See application file for complete search history.

(56) References Cited

U.S. PATENT DOCUMENTS 3,253,597 A * 5/1966 Spanel ............................ 450/97
6,946,182 B1 * 9/2005 Allgeuer et al. ................ 428/92

\* cited by examiner

*Primary Examiner* — Aaron Austin
*Assistant Examiner* — Lawrence Ferguson
(74) *Attorney, Agent, or Firm* — Snell & Wilmer L.L.P.

(57) ABSTRACT

The present invention provides an elastic multi-layer film including an oil-resistant layer consisting essentially of thermoplastic polyurethane; and a tie layer consisting essentially of a grafted polymer. The elastic multi-layer film is formed by co-extruding melted resins of the oil-resistant layer and the tie layer. The present invention further provides an elastic article including the elastic multi-layer film and thermoplastic elastomer gel, wherein the elastic article is formed by incorporation of the elastic multi-layer film and thermoplastic elastomer gel using in-molding labeling and injection method.

15 Claims, 2 Drawing Sheets

ELASTIC MULTI-LAYER FILMS AND ELASTIC ARTICLE THEREOF

CROSS-REFERENCE TO RELATED APPLICATION

This application claims the right of priority based on Taiwan Patent Application No. 100147928 entitled "ELASTIC MULTI-LAYER FILMS AND ELASTIC ARTICLE THEREOF," filed on Dec. 22, 2011, which is incorporated herein by reference and assigned to the assignees herein.

BACKGROUND OF THE INVENTION

1. Field of the Invention

This invention is related to an elastic multi-layer film, and more particularly, to an elastic multi-layer film comprising a thermoplastic polyurethane and a grafted polymer, and to an article thereof.

2. Description of the Prior Art

The thermoplastic elastomer, the so-called TPE, or the thermoplastic rubber, the so-called TPR, is frequently used as elastic thin film material for the plastic processing maker. In the field of the processing application, other physical properties in addition to the elasticity of the elastic thin film are also important, which can determine whether it can be developed successfully or not. In other words, good elastic thin films need to have not only the sufficient elasticity but also other necessary physical properties, so as to satisfy the request of the application.

From the application of the shoe materials, lots of research studies focus on shoe-pad formed by elastic thin film materials. For example, U.S. Pat. No. 5,756,195 and U.S. Pat. No. 7,685,744 disclosed a shoe-pad material respectively, comprising a cloth and SEBS (styrene/ethylene/butylene/styrene copolymer) gel. In addition, U.S. Pat. No. 4,666,782 also disclosed a sulfured rubber utilized for shoe-pad and comprising thermoplastic polyurethane (TPU) and 15 wt % polyether, which provides the oil resistant and anti-crack properties. The U.S. Pat. No. 5,542,196 disclosed another shoe-pad applicable material, which is a thermoplastic elastomer made by thermoplastic polyurethane and vinyl acetate copolymer.

However, current elastic thin film materials still exhibit many disadvantages. For example, a conventional method for manufacturing the shoe-pad by thermoplastic rubber is using a solvent type adhesive to adhere the cloth and the thermoplastic rubber. However, during lamination the solvent based adhesive spreads the toxic gas and undesired residue, which are very difficult to handle. Therefore, there is a need to provide a novel elastic thin film material that can solve the conventional problem.

SUMMARY OF THE INVENTION

One aspect of this invention is to provide an elastic multi-layer film including an oil-resistant layer and a tie layer, wherein the oil-resistant layer comprises a thermoplastic polyurethane and the tie layer comprises a grafted polymer. The thickness of the single oil resistant layer is between 5 um and 250 um and the thickness of the single tie layer is between 5 um and 250 um. The elastic multi-layer film is formed by co-extruding melted resins of the oil-resistant layer and the tie layer using technology of cast film or blown film.

Another aspect of this invention is to provide an elastic multi-layer film comprising an oil-resistant layer, a tie layer and a sub-tie layer, wherein the tie layer is formed between the oil resistant layer and the sub-tie layer. The oil resistant layer comprises a thermoplastic polyurethane; the tie layer comprises a grafted copolymer; and sub-tie layer comprises a non-grafted alkene resin. The thickness of the single oil resistant layer is between 5 um and 250 um, the thickness of the single tie layer is between 5 um and 250 um; and the thickness of the single sub-tie layer is between 5 um and 250 um. The elastic multi-layer film is formed by co-extruding melted resins of the oil-resistant layer, tie layer and the sub-tie layer using technology of cast film or blown film.

Yet another aspect of this invention is to provide an elastic article comprising the elastic multi-layer film as above-mentioned and the thermoplastic elastomer gel. The elastic article is formed by in-mold labeling and the injection technology such that the thermoplastic elastomer gel and the elastic multi-layer film are integrated into a body. The elastic article of this invention has no generated oil and no wrinkles and can be used in the products related to personal health care appliances, exercise care appliances, medical rectification appliances, shoes and any accessory thereof. For the application of the shoe products, the elastic multi-layer film replaces the traditional cloth adhering to the thermoplastic elastomer. Thus, the solvent type adhesive is no more needed and the problem of the environment protection is solved.

This invention still comprises variety of aspects and embodiments to solve other problems. The aspects as above-mentioned and other aspects will be detailed described in the following embodiment.

DETAILED DESCRIPTION OF THE EMBODIMENTS

To fully understand features of this invention and the claim scope, the preferred embodiments of the present invention are illustrated by referring the accompanying drawings. The similar elements in the accompanying drawings employ the same numeral references. It should be noted that in order to clearly illustrate the present invention, each element in the accompanying drawings are not drawn to scale as the actual object. Also, in order to avoid obscuring the content of the present invention, the conventional components, related material and related processing techniques are omitted in the followed description.

The First Embodiment

Figure 1:
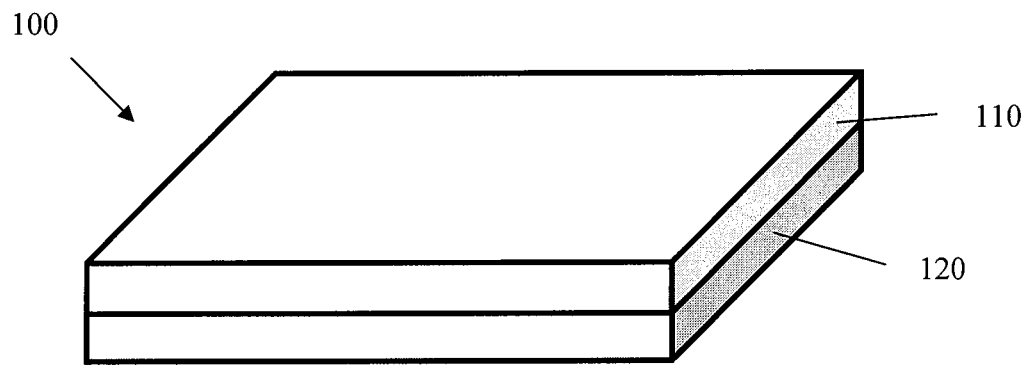
FIG. 1 illustrates the elastic multi-layer film 100 of the first embodiment of this invention.
Figure 2:
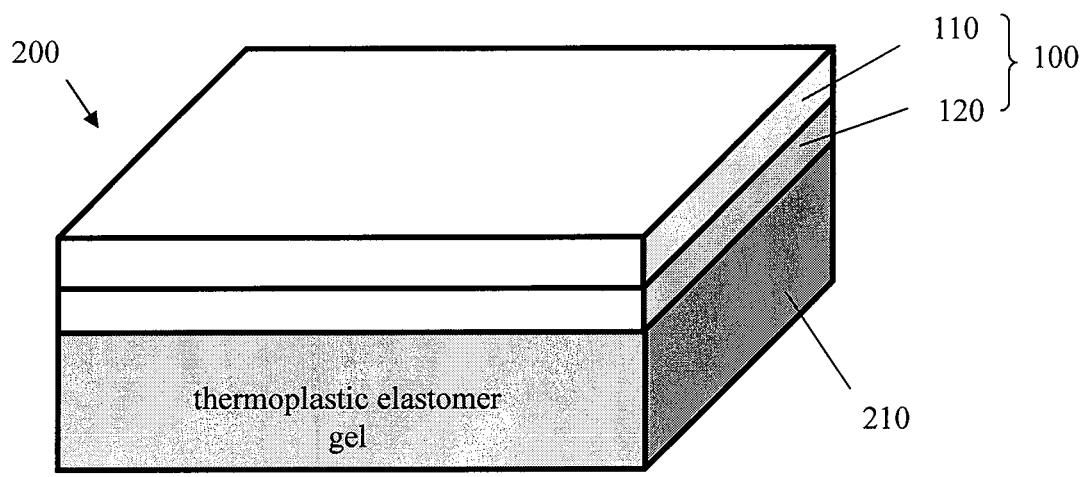
FIG. 2 illustrates the elastic article 200 of the first embodiment of this invention.

FIG. 1 illustrates the elastic multi-layer film 100 of the first embodiment of this invention. FIG. 2 illustrates the elastic article 200 of the first embodiment of this invention, comprising the elastic multi-layer film 100 and the thermoplastic elastomer gel 210. As shown in the Figure, the elastic multi-layer film 100 comprises an oil-resistant layer 110 and a tie layer 120. The oil resistant layer 110 comprises or consists essentially of a thermoplastic polyurethane and the tie layer 120 comprises or consists essentially of a grafted polymer.

Thermoplastic Polyurethane (TPU)

The structure of the thermoplastic polyurethane comprises a hard segment and a soft segment. The structure of the hard segment is consisting of aromatic polyisocyanate, such as toluene diisocyanate (TDI), 4,4-methylene bisphenyl diisocyanate (MDI). The structure of the soft segment is consisting of polyether-polyol or polyester-polyol, such as polyethylene glycol (PEG), polypropylene glycol (PPG), poly(1,4-butylene adipate (PBA), polytetramethylene glycol (PTMG) or 1,4-butane diol (1,4-BD). The weight percent of the polyether-polyol to polyurethane is about 20%-60%. In the structure, the ratio of the hard segment to soft segment is about 0.5~0.8. Meanwhile, the ratio of NCO/OH of the polyurethane is preferably about 0.9~1.2.

Also referring to the FIG. 1 and FIG. 2, the tie layer 120 comprises a grafted polymer. In the preferred embodiments, the grafted polymer can be maleic anhydride grafted linear low-density polyethylene (LLDPE-g-MA), maleic anhydride grafted low-density polyethylene (LDPE-g-MA), maleic anhydride grafted high-density polyethylene (HDPE-g-MA), maleic anhydride grafted polypropylene (PP-g-MA), maleic anhydride grafted styrene block copolymer (SBC-g-MA), glycidyl methacrylate grafted styrene block copolymer (SBC-g-GMA), silane grafted polyethylene (PE-g-silane) and any combination thereof. The density of the linear low-density polyethylene is about 0.915~0.940 g/cm$^3$. The density of the linear high-density polyethylene is about 0.941~0.970 g/cm$^3$. The styrene block copolymer as above-mentioned can be the styrene-ethylene-butylene-styrene of the SEBS block copolymer. The SEBS-g-MA can be the KRATON FG 1901X, which is the commercial name. Generally, the weight percent of the grafted component to the grafted polymer is 0.5 wt % to 5 wt %. For example, using the maleic anhydride as the grafted component, the ratio of the maleic anhydride to the grafted polymer is 0.5 wt % to 5 wt %.

Also referring to the FIG. 1 and FIG. 2, the thickness of the single oil resistant layer 110 is between 5 um and 250 um; the thickness of the single tie layer 120 is between 5 um and 250 um. The elastic multi-layer film 100 is formed by co-extruding melted resins of the oil-resistant layer and tie layer using technology of cast film or blown film. After forming the elastic multi-layer film 100, the thermoplastic elastomer gel 210 and the elastic multi-layer film 100 are then integrally molded by in-mold labeling and injection process to form the elastic article 200.

The Thermoplastic Elastomer Gel

The thermoplastic elastomer gel described in this invention can be made by mixing a thermoplastic elastomer material with a processing oil. The thermoplastic elastomer material comprises, but is not limited to, hydrogenated or non-hydrogenated vinyl aromatic-conjugated diene block copolymer, thermoplastic polyurethane, thermoplastic polyalkene, polyamide, polyurea, polyester and other polymer materials that reversibly soften as a function of temperature. Preferably, the hydrogenated or unhydrogenated vinyl aromatic-conjugated diene block copolymer is more suitable. In the vinyl aromatic-conjugated diene block copolymer, the ratio of the conjugated diene to the vinyl aromatic can be varied. Many types of the multi block copolymer can be selected, such as linear, radial symmetry or radial asymmetry, or tapered block copolymer. Preferably, the ratio of the selected vinyl aromatic to the total block copolymer is less than 60 wt % of the vinyl aromatic-conjugated diene block copolymer. Regarding to the polymerized monomer of the vinyl aromatic-conjugated diene block copolymer, the conjugated diene comprises 4 to 10 carbon atoms or more typically comprises 4 to 6 carbon atoms, such as 1,3-butadiene, isoprene, 2,3-dimethyl-1,3-butadiene, chloroprene, 1,3-pentadiene, 1,3-hexadiene or any combination thereof, preferably is 1,3-butadiene or isoprene. The exemplary monomer of the vinyl aromatic comprises styrene, substituted styrene and the isomer thereof, such as p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4methylstyrene and any combination thereof. The preferable vinyl aromatic is styrene.

One embodiment of this invention uses the SEBS (styrene-ethylene-butylene-styrene). The SEBS is a hydrogenated product of SBS (styrene-butadiene-styrene) triblock polymer, also called hydrogenated SBS. Another embodiment uses hydrogenated product of the SIS (styrene-isoprene-styrene) triblock polymer, called hydrogenated SIS or SEPS (styrene-ethylene-propylene-styrene). Yet another embodiment uses the fourblock polymer SIBS (styrene-isoprene-butadiene-styrene). Yet another embodiment uses another triblock polymer S(I/B)S (styrene-(isoprene/butadiene mix)-styrene). Yet another embodiment uses the hydrogenated product of S(I/B)S, called SEEPS (styrene-ethylene-ethylene-propylene-styrene).

According to the embodiment of this invention, the number average molecular weight of the vinyl aromatic-conjugated diene block copolymer is between about 20,000 and about 500,000, preferably is between 40,000 and 300,000, wherein the number average molecular weight of the vinyl aromatic group is about 2,000 to 125,000, preferably is between 4,000 and 60,000. The processing oil contained in the thermoplastic elastomer gel of this invention is selected from paraffin oil, naphthenic oil, aromatic oil and any combination thereof.

Example 1-1

TPU/LLDPE-g-MA Elastic Two-Layer Film 100 by Cast Film Method and Elastic Article 200

An appropriate amount of TPU and LLDPE-g-MA materials are prepared, wherein the TPU is the ESTANE® TPU 90A/42D manufactured by Lubrizol Advanced Materials, Inc. and the LLDPE-g-MA is the PX3227 manufactured by LYONDELL. The materials as above-mentioned are melted and co-extruded through heating by the extrusion machine of the cast film equipment. Then a thin film is formed through a die member. Next, the thin film is cooled by a cooling wheel and wound to form the elastic multi-layer film 100, wherein the thickness of the oil-resistant layer 110 (thermoplastic polyurethane) is 150 um and the thickness of the tie layer 120 (LLDPE-g-MA) is 50 um. After the formation of the elastic multi-layer film 100, the thermoplastic elastomer gel 210 (with processing oil SEBS) and the elastic multi-layer film 100 are then integrally molded by in-mold labeling and injection process to form the elastic article 200.

Oil and Wrinkle Test

Place an elastic article on a paperboard, wherein the elastic surface (oil resistant layer 110) faces downward. Then, place the elastic article into an oven at 70° C. for 6 hrs to be tested. If there is oil sludge found on the paperboard, it means that the oil has generated. Then, check if the elastic surface is as smooth as it is before being placing into the oven. If not, it means that a wrinkle surface has generated. The elastic article 200 made in the example 1-1 has no generated oil and no wrinkle surface after passing the test as above-mentioned.

Adhesion Test

The adhesion between the oil resistant layer 110 and the tie layer 120 of the example 1-1 is tested by ASTM D882 method. The definition of "un-tearable" means that when stretching a multi-film and increasing the length thereof, only the length in horizontal direction is deformed while the adhesive interface between two thin films is not separated continuously. The result of the adhesion test between the oil resistant layer 110 and the tie layer 120 of the example 1-1 is un-tearable. The result of the adhesion test between the tie layer 120 and the thermoplastic elastomer gel 210 of the example 1-1 is 2.8 lb/in.

Example 1-2

TPU/LLDPE-g-MA Elastic Two-Layer Film 100 by Blown Film Method and Elastic Article 200

An appropriate amount of TPU and LLDPE-g-MA materials are prepared, wherein the TPU is the ESTANE® TPU 90A/42D manufactured by Lubrizol Advanced Materials, Inc. and the LLDPE-g-MA is the Plexar® PX3227 manufactured by LYONDELL. The materials as above-mentioned are melted and co-extruded when heating by the extrusion machine of blown film equipment. Then a thin film is formed through a tubular die member. Next, the thin film is cooled by air-cooling method and wound to form an elastic multi-layer film 100, wherein the thickness of the oil-resistant layer 110 (thermoplastic polyurethane) is 150 um and the thickness of the tie layer 120 (LLDPE-g-MA) is 50 um. After the formation of the elastic multi-layer film 100, the thermoplastic elastomer gel 210 (with processing oil SEBS) and the elastic multi-layer film 100 are then integrally molded by in-mold labeling and injection process to form the elastic product 200. Under the test of oil and wrinkle by using the method above-mention, the elastic article 200 of this example is no oil generated and no wrinkle surface. The result of the adhesion test between the oil resistant layer 110 and the tie layer 120 of this example is un-tearable.

Examples 2-1, 2-2, 3-1 and 3-2 of this invention are made using methods similar to the method as above-mentioned. Table 1 lists the experiment conditions and the results of the Examples 1-1, 1-2, 2-1, 2-2, 3-1 and 3-2, wherein the material LDPE-g-MA is the Yparex® 9207 manufactured by the DSM company and the PP-g-MA is the Plexar® PX6002 manufactured by the LYONDELL.

Comparative Example C1-1

PP-g-MA Elastic Single-Layer Cast Film and Elastic Article

An appropriate amount of PP-g-MA materials, Plexar® PX6002 manufactured by LYONDELL, is prepared. The materials as above-mentioned are melted and co-extruded through heating by the extrusion machine of cast film equipment. Then a thin film is formed through a die member. Next, the thin film is cooled by cooling wheel and wound to form an elastic single-layer film with 50 um in thickness. After forming the elastic single-layer film, the thermoplastic elastomer gel (with processing oil SEBS) and the elastic single-layer film are then integrally molded by in-mold labeling and injection process to form the elastic article. Under the test of oil and wrinkle by using the method as above-mentioned, the elastic article of this example is oil generated and wrinkle surfaced.

Comparative Example C1-2

PP-g-MA Elastic Single-Layer Blown Film and Elastic Article

An appropriate amount of PP-g-MA materials, Plexar® PX6002 manufactured by LYONDELL, is prepared. The materials as above-mentioned is melted and co-extruded when heating by the extrusion machine of blown film equipment. Then a thin film is formed through a tubular die member. Next, the thin film is cooled by air-cooling method and wound to form an elastic single-layer film with 50 um in thickness. After formation of the elastic single-layer film, the thermoplastic elastomer gel (with processing oil SEBS) and the elastic multi-layer film are then integrally molded by in-mold labeling and injection process to form the elastic article. Under the test of oil and wrinkle by using the method as above-mentioned, the elastic article of this example is oil generated and wrinkle surfaced.

The comparative examples C2-1, C2-2, C3-1 and C3-2 are made using methods similar to the method as above-mentioned. Table 2 lists the experiment conditions and the results of the comparative examples C1-1, C1-2, C2-1, C2-2, C3-1 and C3-2, wherein the material TPU is the ESTANE® TPU 90A/42D manufactured by the Lubrizol Advanced Materials, Inc. and the non-grafted PP is the 5018T manufactured by YUNGSOX.

TABLE 1

| Examples | 1-1 | 1-2 | 2-1 | 2-2 | 3-1 | 3-2 |
| --- | --- | --- | --- | --- | --- | --- |
| Type | Cast film | Blown film | Cast film | Blown film | Cast film | Blown film |
| Materials | TPU/ LLDPE-g-MA | TPU/ LLDPE-g-MA | TPU/ LDPE-g-MA | TPU/ LDPE-g-MA | TPU/ PP-g-MA | TPU/ PP-g-MA |
| Thickness of the oil resistant layer (um) | 150 | 150 | 150 | 150 | 150 | 150 |
| Thickness of the tie layer (um) | 50 | 50 | 50 | 50 | 50 | 50 |
| Generated oil | No | No | No | No | No | No |
| Wrinkle | No | No | No | No | No | No |
| Adhesion test (lb/in) (oil resistant layer/tie layer) | Un-tearable | Un-tearable | 0.03 | 0.03 | Un-tearable | Un-tearable |
| Adhesion test (lb/in) (tie layer/gel layer) | 2.8 | 2.8 | >2.8 | >2.8 | 0.58 | 0.58 |

TABLE 2

| Comparative examples | C1-1 | C1-2 | C2-1 | C2-2 | C3-1 | C3-2 |
|---|---|---|---|---|---|---|
| Types | Cast film | Blown film | Cast film | Blown film | Cast film | Blown film |
| Materials | PP-g-MA | PP-g-MA | TPU | TPU | Non-grafted PP | Non-grafted PP |
| Thickness of single layer (um) | 50 | 50 | 150 | 150 | 150 | 150 |
| Generated oil | Yes | Yes | No | No | Yes | Yes |
| Wrinkle | Yes | Yes | No | No | Yes | Yes |
| Adhesion test (lb/in) (Single layer/gel layer) | >2.8 | >2.8 | <0.58 | <0.58 | >0.58 | >0.58 |

Other comparative examples of single-layer film using non-grafted PP instead of non-grafted LLDPE or non-grafted LDPE are performed by way of cast or blown film method. The non-grafted LLDPE is from Mitsui SP-2510 and non-grafted LDPE is NA112-27 from USI Company. The results are similar to the comparative example C3-1 and C3-2.

The Second Embodiment

Figure 3:
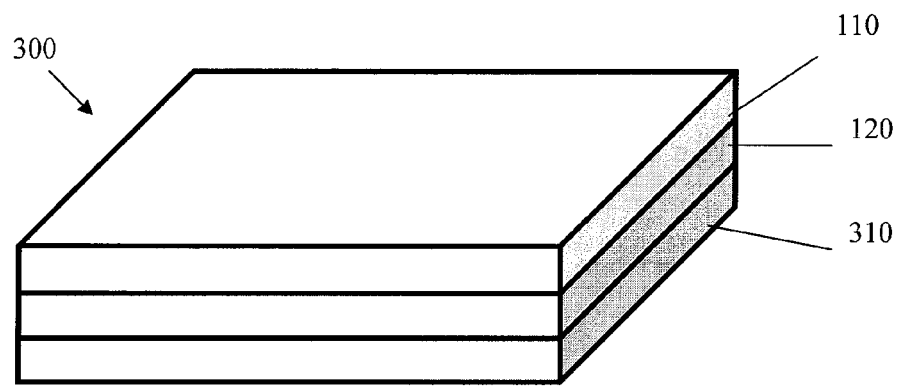
FIG. 3 illustrates the elastic multi-layer film 300 of the second embodiment of this invention.
Figure 4:
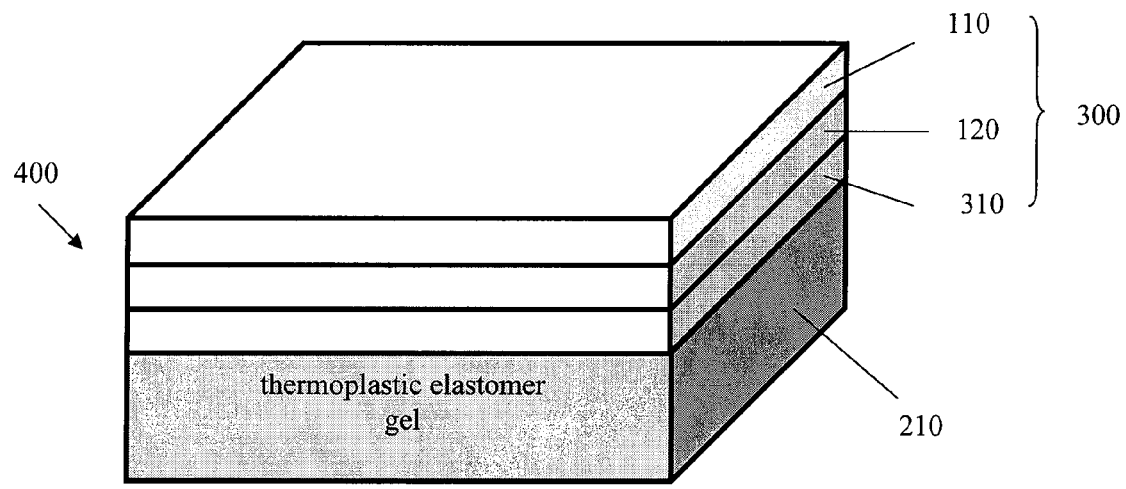
FIG. 4 illustrates the elastic article 400 of the second embodiment of this invention.

FIG. 3 shows the elastic multi-layer film 300 according to the second embodiment of this invention. FIG. 4 shows the elastic article 400 according to the second embodiment of this invention, wherein the elastic article 400 comprises the elastic multi-layer film 300 as above-mentioned and the thermoplastic elastomer gel 210.

As shown in FIG. 3 and FIG. 4, the elastic multi-layer film 300 comprises an oil resistant layer 110, a tie layer 120 and a sub-tie layer 310. The tie layer 120 is formed between the oil resistant layer 110 and the sub-tie layer 310. The oil resistant layer 110 comprises the thermoplastic polyurethane and the tie layer 120 having a grafted polymer. The detail description of the thermoplastic polyurethane and the grafted polymer can refer to the first embodiment. The sub-tie layer 310 comprises non-grafted alkene resin, preferably without any grafted resin. The so-called non-grafted alkene resin indicates an alkene polymer without any grafted group, such as polyethylene (PE), polypropylene (PP) or ethylene and α-alkene polymerized polyolefin elastomer (POE).

Referring to the FIG. 3 and FIG. 4, the thickness of the single oil resistant layer 110 is between 5 um and 250 um; the thickness of the single tie layer 120 is between 5 um and 250 um; and the thickness of the single sub-tie layer 310 is between 5 um and 250 um. The elastic multi-layer film 300 is formed by co-extruding the melted resins of the oil-resistant layer, tie layer and the tie sub-layer using technology of cast film or blown film. After forming the elastic multi-layer film 300, the thermoplastic elastomer gel 210 and the elastic multi-layer film 300 are then integrally molded by in-mold labeling and injection process to form the elastic article 400. The detail description of the thermoplastic elastomer gel can refer to the first embodiment.

Example 4-1

TPU/LLDPE-g-MA/PE Elastic Three-Layer Film 300 by Cast Film Method and Elastic Article 400

An appropriate amount of TPU, LLDPE-g-MA materials and PE are prepared wherein the TPU is the ESTANE® TPU 90A/42D manufactured by Lubrizol Advanced Materials, Inc. and the LLDPE-g-MA is the PX3227 manufactured by LYONDELL and the PE is the Yparex® 9207 manufactured by DSM. The materials as above-mentioned are melted and co-extruded through heating by the extrusion machine of cast film equipment. Then a thin film is formed through a die member. Next, the thin film is cooled by a cooling wheel and wound to form an elastic multi-layer film 300, wherein the thickness of the oil-resistant layer 110 (thermoplastic polyurethane) is 150 um, the thickness of the tie layer 120 (LLDPE-g-MA) is 50 um and the thickness of the sub-tie layer 310 (PE) is 50 um. After forming the elastic multi-layer film 300, the thermoplastic elastomer gel 210 (with processing oil SEBS) and the elastic multi-layer film 300 are then integrally molded by in-mold labeling and injection process to form the elastic article 400. Under the test of oil and wrinkle by using the method as above-mentioned, the elastic article 400 of this example is no oil generated and no wrinkle surfaced. Similar results are obtained when using PP (5018T manufactured by YUNGSOX) or POE (Engage 8100) instead of PE materials as above-mentioned.

Example 4-2

TPU/LLDPE-g-MA/PE Elastic Three-Layer Film 300 by Blown Film Method and Elastic Article 400

An appropriate amount of TPU, LLDPE-g-MA materials and PE are prepared, wherein the TPU is the ESTANE® TPU 90A/42D manufactured by Lubrizol Advanced Materials, Inc. and the LLDPE-g-MA is the Plexar® PX3227 manufactured by LYONDELL and the PE is the Yparex® 9207 manufactured by DSM. The materials as above-mentioned are melted and co-extruded when heating by the extrusion machine of blown film equipment. Then a thin film is formed through a tubular die member. Next, the thin film is cooled by air cooling and wound to form an elastic multi-layer film 300, wherein the thickness of the oil-resistant layer 110 (thermoplastic polyurethane) is 150 um, the thickness of the tie layer 120 (LLDPE-g-MA) is 50 um and the thickness of the sub tie layer 310 (PE) is 50 um. After forming the elastic multi-layer film 300, the thermoplastic elastomer gel 210 (with processing oil SEBS) and the elastic multi-layer film 300 are then integrally molded by in-mold labeling and injection process to form the elastic article 400. Under the test of and wrinkle by using the method as above-mentioned, the elastic article 400 of this example is no oil generated and no wrinkle surfaced. Similar results are obtained when using PP (5018T manufactured by YUNGSOX) or POE (Engage 8100) instead of the PE materials as above-mentioned.

The above-mentioned are only the preferred embodiments of the present invention, but not limiting the claims of the present invention; all the equivalent variations or modifications without departing from the spirit disclosed by the present invention should be construed falling within the scope of the following claims.

What is claimed is:

1. An elastic article, comprising an elastic multi-layer film and a thermoplastic elastomer gel, the thermoplastic elastomer gel comprising a vinyl aromatic-conjugated diene block copolymer and a processing oil, the elastic multi-layer film including:
   an oil-resistant layer, comprising a thermoplastic polyurethane; and
   a tie layer, comprising a grafted polymer,
   wherein the elastic multi-layer film is formed by co-extruding melted resins of the oil-resistant layer and the tie layer.

2. The elastic article according to claim 1, wherein the grafted polymer is selected from maleic anhydride grafted linear low-density polyethylene (LLDPE-g-MA), maleic anhydride grafted low-density polyethylene (LDPE-g-MA), maleic anhydride grafted high-density polyethylene (HDPE-g-MA), maleic anhydride grafted polypropylene (PP-g-MA), maleic anhydride grafted styrene block copolymer (SBC-MA), glycidyl methacrylate grafted styrene block copolymer (SBC-g-GMA), silane grafted polyethylene (PE-g-silane) and any combination thereof.

3. The elastic article according to claim 1, wherein the grafted polymer has a concentration of grafted component ranged between 0.5 wt % to 5 wt % based on the total amount of the grafted polymer.

4. The elastic article according to claim 3, wherein the grafted component is maleic anhydride.

5. The elastic article according to claim 1, wherein the thickness of the oil-resistant layer is between 5 um and 250 um, the thickness of the tie layer is between 5 um and 250 um.

6. The elastic article according to claim 1, further comprising a sub-tie layer comprising a non-grafted alkene resin, wherein the tie layer is formed between the oil-resistant layer and the sub-tie layer, and the elastic multi-layer film is formed by co-extruding melted resins of the oil-resistant layer, the tie layer and the sub-tie layer.

7. The elastic article according to claim 6, wherein the non-grafted alkene resin is selected from polyethylene (PE), polypropylene (PP), polyolefin elastomer (POE) and any combination thereof.

8. The elastic article according to claim 6, wherein the thickness of the sub-tie layer is between 5 um and 250 um.

9. The elastic article according to claim 1, wherein the elastic article is integrally formed by the thermoplastic elastomer gel and the elastic multi-layer film using an in-mold labeling and injecting technology.

10. The elastic article according to claim 1, wherein a monomer of the vinyl aromatic is selected from the group consisting of styrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene and any combination thereof.

11. The elastic article according to claim 1, wherein the conjugated diene is selected from the group consisting of 1,3-butadiene, isoprene, 2,3-dimethyl-1,3-butadiene, chloroprene, 1,3-pentadiene, 1,3-hexadiene and any combination thereof.

12. The elastic article according to claim 1, wherein the processing oil is selected from the group consisting of paraffin oil, naphthenic oil, aromatic oil and any combination thereof.

13. The elastic article according to claim 1, wherein the number average molecular weight of the vinyl aromatic-conjugated diene block copolymer is between 20,000 and 500,000.

14. The elastic article according to claim 1, wherein the number average molecular weight of vinyl aromatic group the vinyl aromatic-conjugated diene block copolymer is 2,000 to 125,000.

15. A product comprising the elastic article according to claim 1, wherein the product applications are selected from the group consisting of personal health care appliances, exercise care appliances, medical rectification appliances, shoes and any accessory thereof.

* * * * *